H. L. DE ZENG.
OPTICAL INSTRUMENT.
APPLICATION FILED JUNE 9, 1920.
1,431,782.
Patented Oct. 10, 1922.
2 SHEETS—SHEET 1.
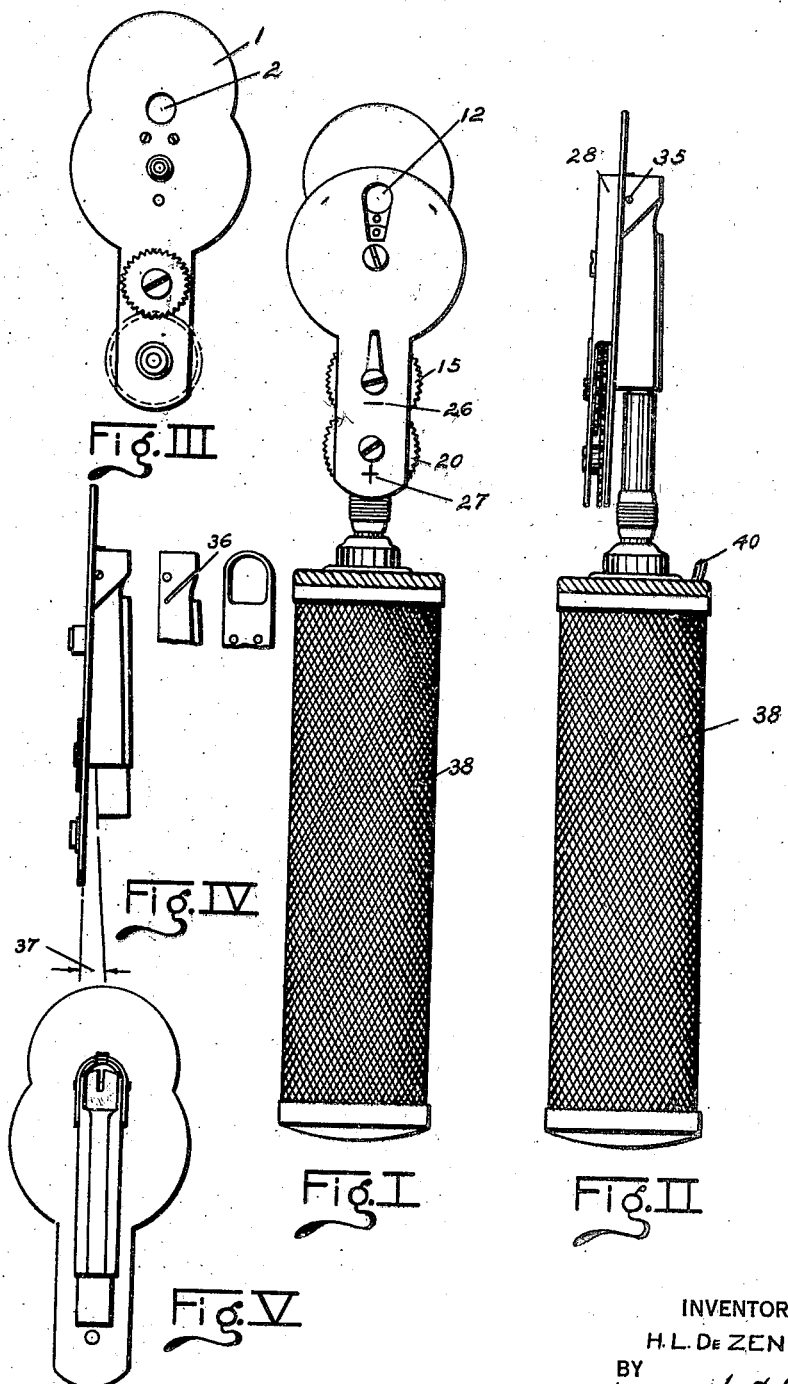
INVENTOR
H. L. DE ZENG
BY
Harry H. Styll.
ATTORNEY H. L. DE ZENG.
OPTICAL INSTRUMENT.
APPLICATION FILED JUNE 9, 1920.
1,431,782.
Patented Oct. 10, 1922.
2 SHEETS—SHEET 2.
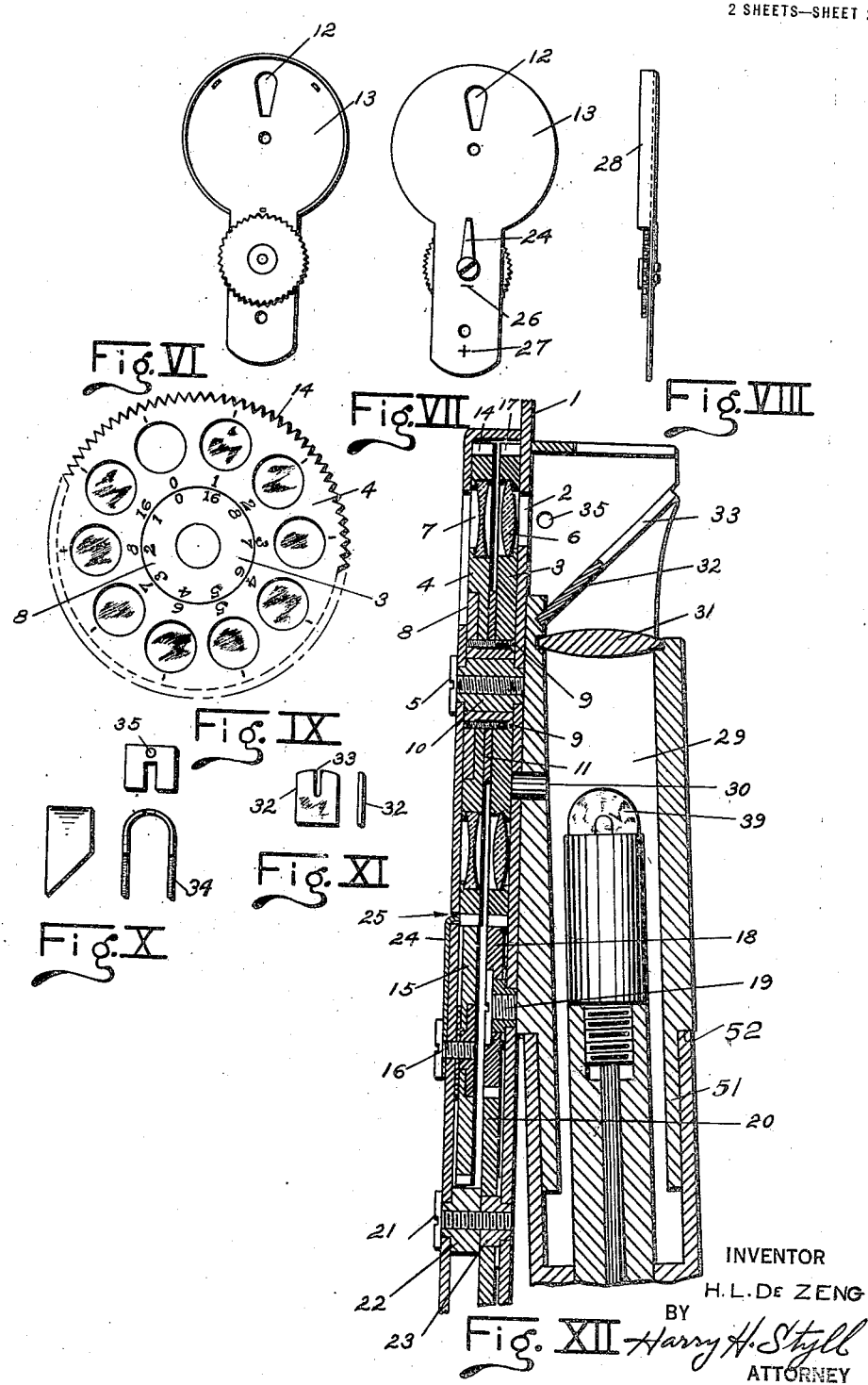
INVENTOR
H. L. DE ZENG
BY
Harry H. Styll
ATTORNEY Patented Oct. 10, 1922.

1,431,782

UNITED STATES PATENT OFFICE.

HENRY L. DE ZENG, OF MOORESTOWN, NEW JERSEY.

OPTICAL INSTRUMENT.

Application filed June 9, 1920. Serial No. 387,687.

*To all whom it may concern:*

Be it known that I, HENRY L. DE ZENG, a citizen of the United States, residing at Moorestown, in the county of Burlington and State of New Jersey, have invented certain new and useful Improvements in Optical Instruments, of which the following is a specification.

This invention relates to improvements in optical instruments and has particular reference to an improved form of instrument for viewing the interior of the eye and measuring its refraction, such as an ophthalmascope.

The principal object of the present invention is to provide means for obtaining a wide angle of observation for the observer and yet have ample room for the adjustment of movable parts.

Other objects of the invention are to provide a simple yet complete lens system, to bring the observer's eye closer to the reflector; to provide improved driving mechanism for the lenses; to provide an improved dust proof case for the lenses; and to provide a short necked instrument.

Other objects and advantages of my improved construction include the simplification of parts and the various structural features and details by which the foregoing advantages may be accomplished in a practical manner, as should be apparent by reference to the following specification taken in connection with the accompanying drawings, in which the preferred form of the instrument and its parts are shown and described for the sake of illustration, but it will be understood that I may make any modifications in the specific details of construction shown and described within the scope of the appended claims without departing from or exceeding the spirit of the invention.

Figure I represents a front view of an ophthalmascope embodying my invention.

Figure II represents a side elevation of Figure I.

Figure III represents a plan view of the gear side of the base plate of the casing.

Figure IV represents an end view or side elevation of Figure III, showing detached segments of the mirror holder.

Figure V represents a back view of Figure IV.

Figure VI represents a plan view of the inside of the gear cover.

Figure VII represents a plan view of the outside of Figure VI.

Figure VIII represents an end or side elevation of Figure VII.

Figure IX represents a diagrammatic front view of the lens containing discs removed from the casing.

Figure X shows plan, side and top views of the strap for retaining the mirror in place.

Figure XI represents a front and end view of the mirror.

Figure XII represents an enlarged cross section through the gear casing and light conducting channel showing the details of construction of the gear arrangements and lighting system.

In instruments for examing the eye, in which the oculist or observer looks through an opening in the instrument into the patient's eye at the same time reflecting a beam of light into the patient's eye for illumination thereof, great difficulty has been encountered owing to the restricted angle of vision which the observer is able to obtain due to the fact that the bulk of the parts of the instrument removes the eye of the observer quite a distance from the front of the instrument and the surface of the reflector, the situation being perfectly analogous to a view obtained through a key-hole, the closer the eye to the key-hole the wider the angle of observation on the other side, so it is with the ophthalmascope and other instruments of like nature. In my present invention I have improved these conditions materially by reducing the distance between the back and front of the instrument to a minimum and to an extent never hitherto obtained as far as I am aware, in an electrically lighted instrument of this nature.

Another serious objection to instruments of this nature is that heretofore there has been insufficient room for the adjustment of the light without placing the reflector in a position limiting the angle of observation.

In my present invention I have increased this restricted area to an extent allowing full room for these adjustments and at the same time have obtained a wider angle of observation.

It is a well known fact that the surfaces of lenses when exposed are hard to keep clean. They blur readily unless kept covered and away from dust, soot or other foreign matter. They not only are apt to become soiled very easily, requiring constant attention, but also the dust particles are liable to scratch and otherwise injure the surfaces of the lenses. In instruments hitherto produced, wherein lenses are carried in revolving disks the rotation of the disks has been effected through comparatively large openings in the sides of the case through which dust or other foreign matter might reach the lenses. In my invention I have devised means for providing a dust proof case over the lens holders allowing only the lens under immediate observation to be exposed and at the same time I provide more accessible means for driving the lens holders.

Referring to the drawings in which similar characters of reference are employed to denote corresponding parts throughout the several views, the following is a description and method of operation of the preferred form of my invention which is described by way of illustration.

The instrument illustrated comprises lenses, lens holding and driving mechanism, peep hole arrangements, illuminating guide and reflector, and a handle containing a source of electric energy. The instrument is built up around the base plate 1, Figure III, which has an opening or orifice 2 through which the operator looks into the patient's eye. On the operator's side of the instrument, which is the left hand side in Figure XII, the lens holders 3 and 4 are rotatably mounted on the pivot 5 in such a way that the individual lenses may be brought in turn before the orifice 2 in the base plate.

The lens holders consist of two independent gear driven discs 3 and 4. The lenses 6 in the disc 3 are positive in character except that one or more lenses of the opposite character are introduced at the end of the train and the lenses 7 in the disc 4 are negative in character except at the end of the train one or more lenses of opposite character are introduced. In order that the powers of the lenses in the discs 3 and 4 may be indicated at a central point, a portion 8 of the disc 3 is arranged to come flush with the outer face of the disc 4. This portion 8 of the disc 3 is united therewith by means of screws 9 and it will be seen that the portion 8 forms a bushing or bearing for the disc 4. Between the bushing 8 and the pivot 5 the bearing support 10 is introduced, tending to act as a distant piece between the base plate and the cover plate. A washer member 11 is inserted between the discs 3 and 4 to keep them separated to the desired distance and prevent their rubbing one on the other, also to provide clearance for the lenses when necessary.

The powers of the lenses in the two rings are indicated around the line of separation between the face 8 of the disc 3 and the face of the disc 4, the powers indicated on the disc 4 running from 1 to 7 negative power, and having positive powers 8 and 16 introduced at the end of the train, and the powers of the lenses in the disc 3 running from 1 to 7 in the positive power, having introduced negative powers 8 and 16 at the end of the train. In both rings at the zero power there is no lens inserted, leaving a clear opening through the two lens discs. When in operation the powers of the lenses in the two discs are viewed through a key-hole shaped opening 12 in the cover plate 13, Figures VI and VII, the negative powers for convenience of observation being indicated in one color, say red, and the positive powers in another color, say white.

The lens discs are independently driven by means of gears, best illustrated in Figure I, the upper gear turning the negative lenses in the disc 4 and the lower one turning the positive lenses in the disc 3. Surrounding the disc 4 is a gear or toothed section 14 which meshes with the upper driving gear 15 which is pivoted on the cover plate 13 by the pivot 16. Surrounding the disc 3 is a gear or toothed portion 17 meshing with an idler gear wheel 18 pivoted to the base plate by the pivot 19. This idler gear in turn meshes with the driving gear wheel 20 pivoted on the base plate by means of the pivot 21 which passes through the distance pieces 22 and 23 respectively.

By turning the driving wheel 20 the intermediate idler wheel 18 is turned, which in turn drives the gear wheel turning the positive lenses into position before the orifice 2. By turning the gear wheel 15 the lens disc 4 is immediately engaged and driven, thus turning the negative lenses before the orifice 2. Held in place by the pivot 16 is a spring finger 24 which acts as a spring tension member on the gears, as indicated at the point 25 in Figure XII. On the outer face of the cover plate 13 the character of the lenses turned by the corresponding gear wheels is indicated, the wheel 15, Figure I, being indicated by the negative sign 26 and the wheel 20 by the positive sign 27.

It will be noted that the lower portion of the cover plate and the base plate are cut away so as to allow the driving gears 15 and 20 to extend out beyond. This gives room for the fingers to engage them and turn the gear wheels to drive the respective lens discs. It will also be noted in Figures II and VIII that the cover plate 13 has a flange 28 surrounding the lens discs, the only place the lenses may be seen being at the key-hole opening 12. This arrangement provides simple means of accessibility to the driving gears and makes a dust proof case for the lens discs.

The illuminating system consists of a light channel or guide 29 secured to the patient's side of the instrument, as at 30. At the outer end of this channel is a lens 31 for focusing the light rays from the source of illumination on a slotted mirror 32 shown in detail in Figure XI. This mirror is arranged in inclined position so as to direct the beam of light from the illuminating channel to the patient's eye, the slot 33 being in line with the orifice 2 in the base plate 1. The mirror 32 is held in place by means of the U-shaped strap 34 shown in detail in Figure X, which is screwed over the upper end of the channel portion and held in place by the screw 35, the mirror being held in the slot 36 at the upper end of the channel portion, see Figure IV. The strap 34 holds the mirror in place in this slot.

It will be noted in Figure IV as indicated by the dot and dash lines and the arrows, that the light conducting channel is placed at an angle to the base plate as indicated by 37, Figure IV. This inclination of the light channel to the base plate is most important as it permits the mirror to be brought up to the nearest possible position to the lenses and also allows additional room between the gear portion and the handle portion, permitting adjustment of the light. It also permits the observer to look slightly under the reflection, it being noted in this connection that the axis of the light channel being at an angle to the gear case will have a different angle of reflection in the patient's eye than it would have if the axis of the channel were parallel with the gear case as best shown in Figure XII.

The light conducting channel 29 consists of a tube having an internal light passage way and an external boss or attaching portion which is inclined with respect to the internal light passage way. This boss or attaching portion is for attachment to the supporting plate by means of the rivet 30. This light conducting channel is attached to the handle or battery portions by means of a recessed shoulder or flange portion 51 at its lower end, the recessed flange portion starting at the shoulder 52. The inclination between the internal light passage way and the external attaching portion is of the first importance because it permits the light to be directed directly to the peeping orifice instead of being offset by the thickness of the attaching portion or the thickness of the tube were the light passage way parallel with the supporting plate. By this inclination and conducting the light at an angle to the supporting plate the thickness of the instrument or the distance between the eye of the observer and the eye of the patient is materially reduced.

The source of the illumination is in the handle 38, which consists of the usual battery and bulb connection being shown at 39, Figure XII. The light from the electric bulb is thrown on or off by means of the switch 40 shown in Figure II.

The operation, which has been explained in detail in the foregoing description, is in brief as follows: The electric bulb is illuminated by means of the switch 40, throwing the light up through the channel 29 to the reflector 32, and thence onto the patient's eyes. The eye of the operator is applied to the orifice 2 on the lens side of the instrument and the instrument is moved up closely to the eye of the patient so that the operator may observe the interior of the eye by means of the illumination reflected into it; then the lenses in the lens discs are rotated by the operator through the wheels 15 and 20 until the object in the patient's eye becomes perfectly clear. The powers of the lenses are indicated by the power scales in the key-hole shaped orifice 12 in the cover plate, the algebraic sum of the two powers indicated representing the sum of the test power.

As regards the reflection from the slotted mirror into the patient's eye, it will be noted that by controlling the angle of axis of the light channel 29 to the base plate the angle of reflection of the light may be varied to suit the desires of the operator and to bring the reflected light into the actual position required.

It will also be seen that by throwing in the axis of the light channel at the top the mirrow may be brought closer to the base plate; hence the distance between the operator's eye and the reflector may be materially reduced, thus allowing him a considerably increased angle of observation over the older instruments.

From the above description it will be seen that I have provided in an instrument of this kind, extremely simple means of obtaining a wide angle of observation with ample room for light adjusting means, also of rotating the lenses, of protecting the lenses from dust and foreign matter, and of reducing the size of the instrument, and a simple yet complete lens system.

Having described my invention, what I claim is:

1. In a device of the character described, the combination with a supporting plate element having a sight orifice, a rotating lens element, and a light passageway element superimposed one on the other in immediate contact and in substantially parallel alinement, the lens dial element being pivoted on one side of the supporting plate and adapted to align the lenses successively with the sight orifice and the light passage way element being rigidly secured to the other side of the supporting plate, said light passage way element being provided with a source of light and an inclined mirror having an orifice in line with the orifice of the supporting plate and inclined outwardly and upwardly from its point of connection with the supporting plate.

2. In a device of the character described, the combination of a continuous supporting element having a sight orifice therethrough and a continuous light passage way element substantially parallel therewith and secured thereto and inclined slightly outwardly and downwardly therefrom, said light passage way element comprising a light tube, a source of light therein, a mirror having an orifice in line with the orifice of the supporting plate and inclined from its point of connection with the supporting plate outwardly and upwardly therefrom, the elements being so arranged that the patient's eye may be placed immediately next to the orifice plate in the mirror on one side and the operator's immediately next the orifice in the supporting plate on the other side.

3. In a device of the character described, a straight continuous supporting plate having an orifice and a light tube having its outer surface parallel to and in immediate contact with the supporting plate and secured thereto, and having its inner surface inclined downwardly and outwardly from the supporting plate, a light in the tube, and a mirror with an orifice in line with the orifice of the supporting plate at the end of the tube and inclined outwardly and upwardly from the supporting plate.

2. In a device of the character described, a casing having an orifice, a pair of superimposed rotatable lens discs mounted in the casing and adapted to align with the orifice, a portion of the inner disc extending through the outer disc, a scale on the outer extension of the inner disc adjacent its line of separation from the outer face of the outer disc, and a scale on the face of the outer disc adjacent the scale on the extension, said scales indicating the powers of the lenses in the lens discs.

5. In a device of the character described, a pair of rotatable lens discs, a hub on one of the lens discs on which the other disc is mounted to rotate, a scale on the face of the hub indicating the power of the lenses in the hub disc, and a scale on the face of the mounted disc indicating the powers of the lenses in said disc, the two scales being separated by the line of the hub bearing.

6. In a device of the character described, a casing having an orifice, a pair of rotatable lens discs mounted in the casing adapted to bring the lenses in alinement with the orifice, a hub on the inner disc extending through the outer disc, a scale on the hub, a scale on the outer disc adjacent the first scale, said scales indicating the powers of the lenses in the discs, a gear surrounding the outer disc, a finger gear meshing therewith, a gear surrounding the inner disc, an idler gear meshing therewith, and a finger gear meshing with the idler gear.

7. In a device of the character described, a casing having an orifice, a pair of rotatable lens discs mounted in the casing adapted to bring the lenses in alinement with the orifice, a hub on the inner disc extending through the outer disc, a scale on the hub, a scale on the outer disc adjacent the first scale, said scales indicating the powers of the lenses in the discs, a gear surrounding the outer disc, a finger gear meshing therewith, a gear surrounding the inner disc, an idler gear meshing therewith, a finger gear meshing with the idler gear, and a spring detent engaging the first finger gear.

8. In a device of the character described, a casing having an orifice, a pair of rotatable lens discs mounted in the casing adapted to bring the lenses in alinement with the orifice, a hub on the inner disc extending through the outer disc, a scale on the hub, a scale on the outer disc adjacent the first scale, said scales indicating the powers of the lenses in the discs, a gear surrounding the outer disc, a finger gear meshing therewith, a gear surrounding the inner disc, an idler gear meshing therewith, a finger gear meshing with the idler gear, an inclined tube on the back of the casing, a reflector having an orifice in alinement with the orifice in the casing, and a lamp in the inclined tube.

9. In a hand supported ophthalmological instrument, a hand holding portion comprising a handle, a handle supporting part, a light passage way chamber, an attaching portion arranged at an angle to the hand holding portion, and a base plate secured to the attaching portion of the hand holding element.

10. In a hand supported ophthalmological instrument, the combination of a base plate and a hand holding element, said hand holding element comprising a hand support, a light passage way portion, and an external attaching portion, the hand holding element being arranged at an angle to the outer surface of the attaching portion.

11. In a hand supported ophthalmological instrument, a hand holding element comprising a light chamber having a tubular internal portion and an external attaching portion inclined thereto, and a detachable joint between the light chamber and the hand supporting portion, and a base plate secured to the external attaching portion, said base plate and said hand holding element being inclined at an angle one to the other.

In testimony whereof I have affixed my signature, in presence of two witnesses.

HENRY L. DE ZENG.

Witnesses:
S. W. CAFFERTY,
LYDIA H. LYONS.